(12) United States Patent
Hashiguchi et al.

(10) Patent No.: US 7,492,990 B2
(45) Date of Patent: Feb. 17, 2009

(54) OPTICAL SWITCHING ELEMENT, OPTICAL SWITCHING DEVICE, AND COLOR IMAGE DISPLAYING APPARATUS

(75) Inventors: Tsuyoshi Hashiguchi, Kanagawa (JP); Hideaki Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/633,001

(22) Filed: Dec. 4, 2006

(65) Prior Publication Data
US 2007/0127111 A1    Jun. 7, 2007

(30) Foreign Application Priority Data
Dec. 7, 2005    (JP)    ............... 2005-353658

(51) Int. Cl.
*G02B 6/34*    (2006.01)
(52) U.S. Cl. ............... 385/37; 385/15; 385/16; 385/129
(58) Field of Classification Search .......... 385/15, 385/16, 37, 129
See application file for complete search history.

(56) References Cited

U.S. PATENT DOCUMENTS

| 6,035,089 A | 3/2000 | Grann et al. |
| 6,212,312 B1 | 4/2001 | Grann et al. |
| 6,215,928 B1 | 4/2001 | Friesem et al. |
| 2005/0248829 A1 | 11/2005 | Sawin et al. |

FOREIGN PATENT DOCUMENTS

| JP | 2002-148530 | 5/2002 |
| JP | 2002-287047 | 10/2002 |
| JP | 2005-157133 | 6/2005 |
| KR | 2005-0057412 | 6/2005 |
| WO | WO 97/44686 A | 11/1997 |
| WO | WO 98/57200 A | 12/1998 |

OTHER PUBLICATIONS

Magnusson et al., "Transmission Bandpass Guided-Mode Resonance Filters", Applied Optics, vol. 34, No. 35, pp. 8106-8109, Dec. 10, 1995.
D. Rosenblatt et al., "Resonant Grating Waveguide Structures," IEEE Journal of Quantum Electronics, vol. 33, No. 11, Nov. 1997, pp. 2038-2059.
Magnusson, et al.; "Transmission Bandpass Guided-Mode Resonance Filters"; Applied Optics; vol. 34; No. 35; Dec. 10, 1995; pp. 8106-8109.

*Primary Examiner*—Jennifer Doan
(74) *Attorney, Agent, or Firm*—Dickstein Shapiro LLP.

(57) ABSTRACT

An optical switching element includes a resonant reflection element and a driving unit. The resonant reflection element has a thickness portion functioning as a waveguide layer, with one surface in a thickness direction functioning as a total reflection surface and the other surface having formed thereon a fine periodic structure with fine asperities, the resonant reflection element resonant-reflecting light that is incident from the other surface and has a specific wavelength component. The driving unit varies a resonant wavelength of resonant reflection by varying at least one of a shape and a refractive index of the resonant reflection element.

12 Claims, 8 Drawing Sheets

OPTICAL SWITCHING ELEMENT, OPTICAL SWITCHING DEVICE, AND COLOR IMAGE DISPLAYING APPARATUS

CROSS-REFERENCE TO RELATED APPLICATIONS

The present document incorporates by reference the entire contents of Japanese priority document, 2005-353658 filed in Japan on Dec. 7, 2005.

BACKGROUND OF THE INVENTION

1. Field of the Invention

The present invention relates to an optical switching element, an optical switching device, and an image displaying apparatus.

2. Description of the Related Art

Optical switching elements for light ON/OFF and optical switching element arrays with such optical switching elements arranged in an array have been widely used in the field of optical communications and image displaying apparatuses. Projectors are examples of such image displaying apparatuses.

As examples of elements for optical switching, those using a liquid crystal and those using a micromirror have been widely known. Also, Japanese Patent Application Laid-Open Publication No. 2002-287047 suggests "an interferometric optical switching device that controls light by using a reflection mirror and a semitransparent mirror". This device performs switching by changing a distance between the reflection mirror and the semitransparent mirror and using an optical interference effect.

Meanwhile, R. Magnusson and S. S. Wang, "Transmission band pass guided-mode resonance filters", Appl. Opt. Vol. 34, No. 35, 8106 (1995) (hereinafter referred to as non-patent document) reports "a narrow-bandwidth reflection wavelength filter".

An object of the present invention is to achieve an unprecedented novel optical switching element using the principle of an anomaly phenomenon by a diffraction grating and an optical wavelength reported in the non-patent document mentioned above and, by using such an optical switching element, to achieve a novel optical switching device, an image displaying apparatus, a color image displaying apparatus, and the like.

SUMMARY OF THE INVENTION

It is an object of the present invention to at least partially solve the problems in the conventional technology.

According to an aspect of the present invention, an optical switching element includes a resonant reflection element having a thickness portion functioning as a waveguide layer, with one surface in a thickness direction functioning as a total reflection surface and other surface having formed thereon a fine periodic structure with fine asperities, the resonant reflection element resonant-reflecting specific wavelength component of light incident from the other surface; and a driving unit that varies a resonant wavelength of resonant reflection by varying at least one of a shape and a refractive index of the resonant reflection element.

According to another aspect of the present invention, an optical switching device includes an optical switching element including a resonant reflection element having a thickness portion functioning as a waveguide layer, with one surface in a thickness direction functioning as a total reflection surface and other surface having formed thereon a fine periodic structure with fine asperities, the resonant reflection element resonant-reflecting specific wavelength component of light incident from the other surface; and a driving unit that varies a resonant wavelength of resonant reflection by varying at least one of a shape and a refractive index of the resonant reflection element; and a light source. The optical switching device is configured so that a resonant wavelength is varied by the driving unit to be inside or outside of a light-emission wavelength region of the light source, thereby allowing light extracted via the optical switching element to blink.

According to still another aspect of the present invention, an image displaying apparatus includes an array of optical switching elements, each of the optical switching element including a resonant reflection element having a thickness portion functioning as a waveguide layer, with one surface in a thickness direction functioning as a total reflection surface and other surface having formed thereon a fine periodic structure with fine asperities, the resonant reflection element resonant-reflecting specific wavelength component of light incident from the other surface; and a driving unit that varies a resonant wavelength of resonant reflection by varying at least one of a shape and a refractive index of the resonant reflection element; and a light source unit that irradiates each optical switching element of the optical switching element array with light having one of a resonant wavelength before varying by a driving unit and a resonant wavelength after varying thereby of an optical switching element forming the optical switching element array being included in a light-emission wavelength region. The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below.

Figure 1A:
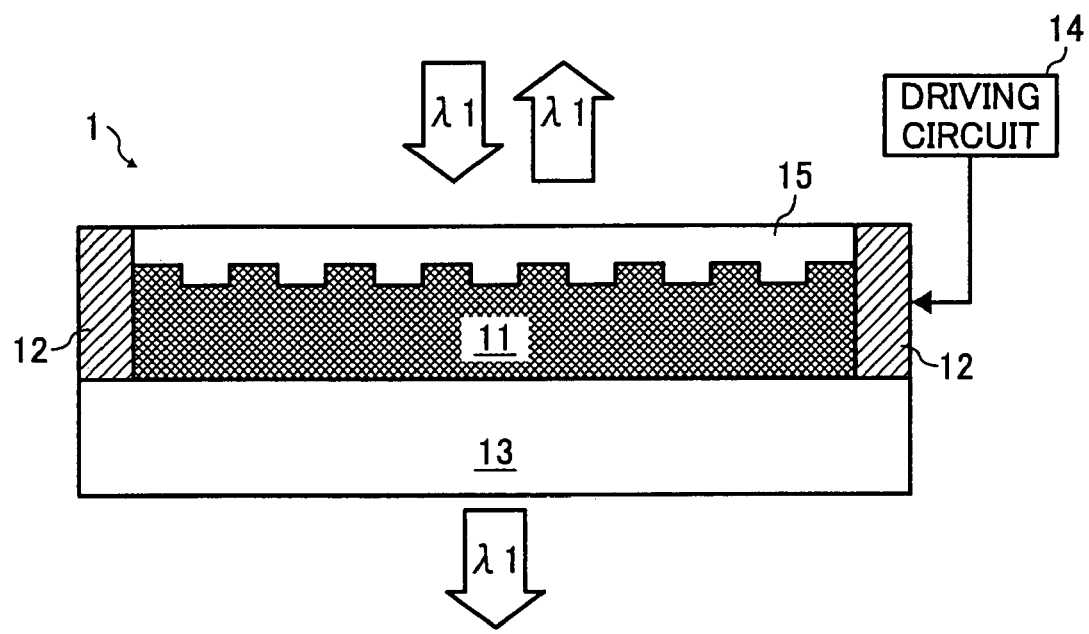
FIGS. 1A and 1B are drawings for explaining an optical switching element according to an embodiment of the present invention.
Figure 1B:
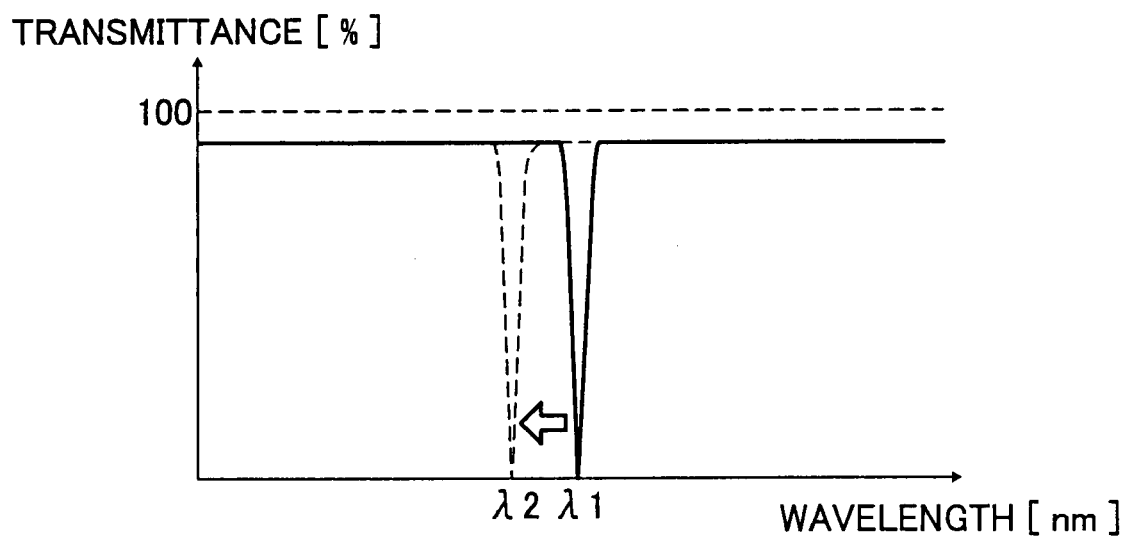

FIGS. 1A and 1B are drawings for explaining an optical switching element according to an embodiment of the present invention.

In FIG. 1A, a reference numeral 1 denotes an optical switching element, a reference numeral 11 denotes a resonant reflection element, a reference numeral 12 denotes driving elements, a reference numeral 13 denotes a transparent substrate, a reference numeral 14 denotes a driving circuit, a reference numeral 15 denotes a transparent protective layer, and the arrows represent light having a wavelength $\lambda 1$.

The resonant reflection element 11 is shaped like a transparent, parallel, flat plate with its thickness portion functioning as a waveguide layer and with one surface in a thickness direction (a boundary surface with respect to the transparent substrate 13) functioning as a total reflection surface and the other surface forming a fine periodic structure with fine asperities. The thickness portion functioning as a waveguide layer corresponds to the thickness of the resonant reflection element 11 with the thickness of the fine periodic structure subtracted therefrom.

The section of the fine periodic structure in the resonant reflection element 11 has a rectangular shape, but is allowed to have various shapes, such as a triangular-wave shape and a sine-wave shape. For simplification of description, it is assumed that the fine periodic structure is one-dimensional and is such that asperities spread in a horizontal direction of the drawing. Also, in the present embodiment, the resonant reflection element 11 is formed in a thin-film shape on the transparent substrate 13.

The transparent protective layer 15 has a refractive index different from that of the resonant reflection element 11. Therefore, because of the material of the transparent protective layer 15 and the material of the resonant reflection element 11, the refractive index of the fine periodic structure is varied in a period of fine asperities in the horizontal direction of the drawing.

The driving elements 12 and the driving circuit 14 form a driving unit. With the driving circuit 14 driving the driving elements 12, any one or both of the shape and the refractive index of the resonant reflection element 11 is varied to vary a resonant wavelength of resonant reflection.

In the embodiment explained herein, when the resonant reflection element 11 is not driven by the driving unit, the resonant wavelength is in a narrow wavelength region including the wavelength $\lambda 1$.

In the state where the resonant reflection element 11 is not driven by the driving unit (in an OFF state), light having the wavelength $\lambda 1$ (light having a wavelength in a narrow wavelength region including the wavelength $\lambda 1$) is launched from the above, as shown in FIG. 1A. The period of the fine periodic structure is similar to or smaller than the wavelength of $\lambda 1$. The incident light is diffracted by the fine periodic structure, wave-guided through the thickness portion (a distance between concave portions of the fine periodic structure and the transparent substrate 13) of the resonant reflection element 11 as a waveguide layer, and then is total-reflected on the boundary surface with respect to the transparent substrate 13. When the propagation constant of the light wave propagating in the waveguide layer upon total reflection coincides with a grid vector based on the grid of the fine periodic structure, strong resonance occurs, resulting in strong reflected light (resonant reflection).

In other words, by adjusting the material of the resonant reflection element 11, the thickness of the waveguide layer, the period of the fine periodic structure, the materials of the transparent layer and the transparent substrate, and others, the optical switching element 1 is configured to produce resonant reflection of light having a wavelength $\lambda 1$ in an OFF state without driving by the driving unit.

In FIG. 1B, a solid line represents the state of transmittance in the configuration explained above.

When any one or both of the refractive index and the shape of the resonant reflection element 11 is varied with the driving elements 12 driven by the driving circuit 14 (an ON state), as depicted in FIG. 1B, the resonant wavelength that causes resonant reflection is shifted from the wavelength $\lambda 1$ before driving to a wavelength $\lambda 2$.

In an ON state, the light having the wavelength $\lambda 1$ incident to the resonant reflection element 11 passes through the optical switching element 1 with a high transmittance.

In FIG. 1A, two arrows above the optical switching element 1 represent a state of resonant reflection of the light having the wavelength of $\lambda 1$ incident in an OFF state before driving by the driving unit. Also, an arrow below the optical switching element represents a state in which, in an ON state where driving by the driving unit has been performed, with the shift of the resonant wavelength shifted to the wavelength $\lambda 2$, the incident light having the wavelength $\lambda 1$ passes through the optical switching element 1 with a high transmittance.

In this manner, with ON/OFF of driving by the driving unit, the resonant wavelength is shifted between the wavelengths $\lambda 1$ and $\lambda 2$, transmission or reflection of the light having the wavelength $\lambda 1$ can be turned ON/OFF, thereby performing optical switching.

For example, in the case of transmitted light, assuming that the state where light having the wavelength .lambda.1 is allowed to pass is taken as an ON state and the state where the light is not allowed to pass is taken as an OFF state, the state of driving by the driving unit is taken as an ON state and the state of not driving is taken as an OFF state. Thus, optical switching is performed where transmitted light is turned ON/OFF by turning ON/OFF the driving unit.

The optical switching element 1 according to the embodiment explained above and as shown in FIG. 1A includes: the resonant reflection element 11 having its thickness portion functioning as a waveguide layer, with one surface in a thickness direction functioning as a total reflection surface and the other surface having formed thereon a fine periodic structure with fine asperities, the resonant reflection element 11 resonant-reflecting a specific wavelength component .lambda.1 of light incident from the other surface (upper surface in FIG. 1A); and the driving unit (12 and 14) that vary a resonant wavelength of resonant reflection by varying any one or both of a shape and a refractive index of the resonant reflection element 11.

Also, the resonant reflection element 11 is formed in a thin film shape on the transparent substrate 13, and the resonant reflection element 11 has a fine periodic structure covered with the transparent protective layer 15.

The driving unit (12 and 14) cause one or more of an electric field, a magnetic field, heat, and mechanical force to be acted on the resonant reflection element 11 to vary any one or both of the refractive index and the shape of the resonant reflection element. Here, the configuration can be such that the driving units cause one or more of the electric field, the magnetic field, heat, and mechanical force to be acted on the resonant reflection element to mainly vary the refractive index of the resonant reflection element 11. Also, the driving units can cause one or more of the electric field, the magnetic field, heat, and mechanical force to be acted on the resonant reflection element to mainly vary the shape of the resonant reflection element 11.

Furthermore, in the embodiment of FIG. 1A, the driving unit (12 and 14) drives the resonant reflection element 11 in a direction orthogonal to a thickness direction of the resonant reflection element 11 (horizontal direction in FIG. 1A). For example, in the case of a driving method in which one or more of the electric field, the magnetic field, heat, and mechanical force are caused to be acted on the resonant reflection element, such one or more of the electric field, the magnetic field, heat, and mechanical force is acted on the resonant reflection element 11 in a horizontal direction in FIG. 2A.

Furthermore, the optical switching element 1 of FIG. 1A is of a transmission type.

Figure 2A:
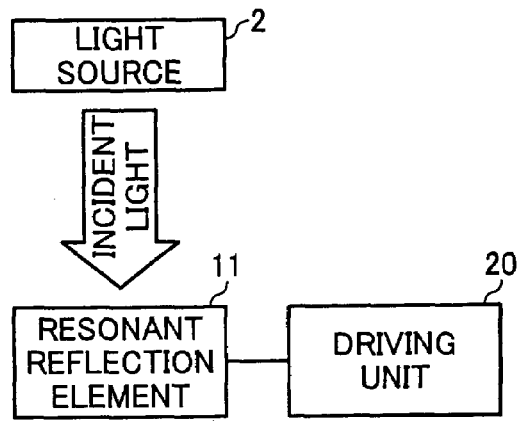
FIGS. 2A, 2B, and 2C are drawings for explaining an optical switching device that uses the optical switching element shown in FIG. 1A.
Figure 2B:
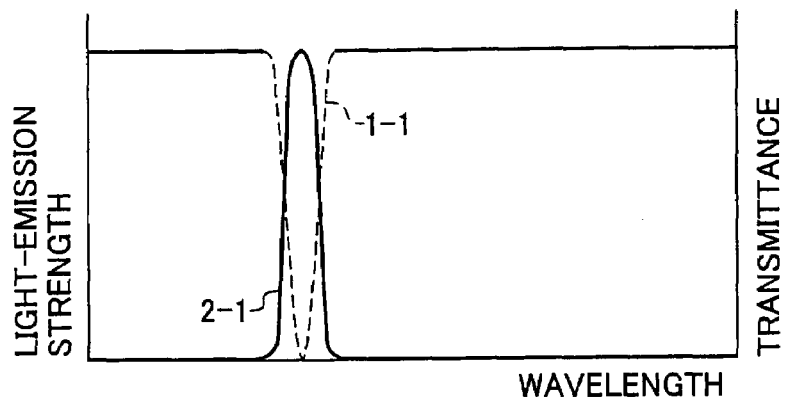
Figure 2C:
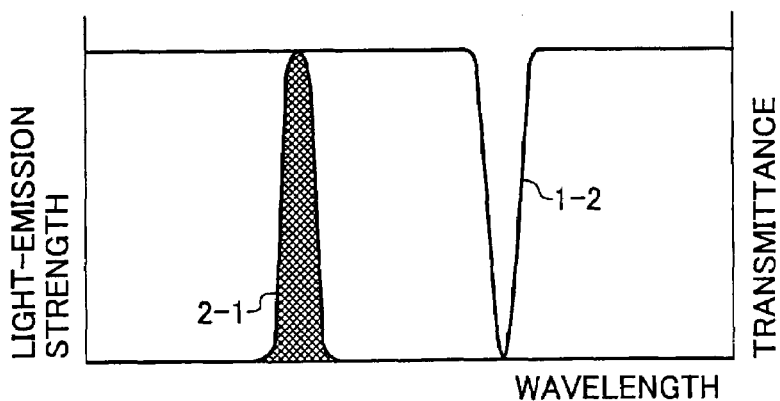

FIGS. 2A, 2B, and 2C are drawings for conceptually explaining an optical switching device using the optical switching element 1 of FIG. 1A according to one embodiment.

In FIG. 2A, a reference numeral 11 denotes the resonant reflection element, and a reference numeral 20 denotes a driving unit. The driving unit 20 collectively represents the driving elements 12 and the driving circuit 14 in FIG. 1A.

A light source 2 is a laser diode (LD) or a light-emitting diode (LED), that emits light in a narrow wavelength range.

FIG. 2B depicts a spectral light-emission strength in the light source 2 and a spectral transmittance in an OFF state where the resonant reflection element 11 is not driven. The light source 2 exhibits a spectral light-emission strength as denoted by a reference numeral 2-1, whilst the resonant reflection element 11 exhibits a spectral transmission characteristic as denoted by a reference numeral 1-1 in an OFF state without driving by the driving unit 20.

As depicted in FIG. 2B, the spectral transmittance 1-1 of the resonant reflection element 11 in an OFF state without driving by the driving unit 20 is substantially superposed on a light-emission wavelength region of the spectral light-emission strength of the light source 2. Therefore, the resonant reflection element 11 in an OFF state resonant-reflects a large portion of the incident light from the light source 2. For this reason, the light passing through the resonant reflection element 11 is extremely small.

FIG. 2C depicts an ON state where the resonant reflection element 11 is driven by the driving unit 20 to shift the resonant wavelength. A spectral transmittance 1-2 of the resonant reflection element in an ON state has a constant high value in the light-emission wavelength region of the light source 2. For this reason, the resonant reflection element 11 allows substantially entire light incident from the light source 2 to pass.

Therefore, with ON/OFF driving of the resonant reflection element 11 by the driving unit 20, transmission of the light passing through the resonant reflection element 11 can be turned ON/OFF.

Here, in the optical switching device explained above, when light reflected on the resonant reflection element 11 is taken as output light, the reflected output light is in an OFF state or ON state according to the ON state or OFF state as explained above.

Figure 3:
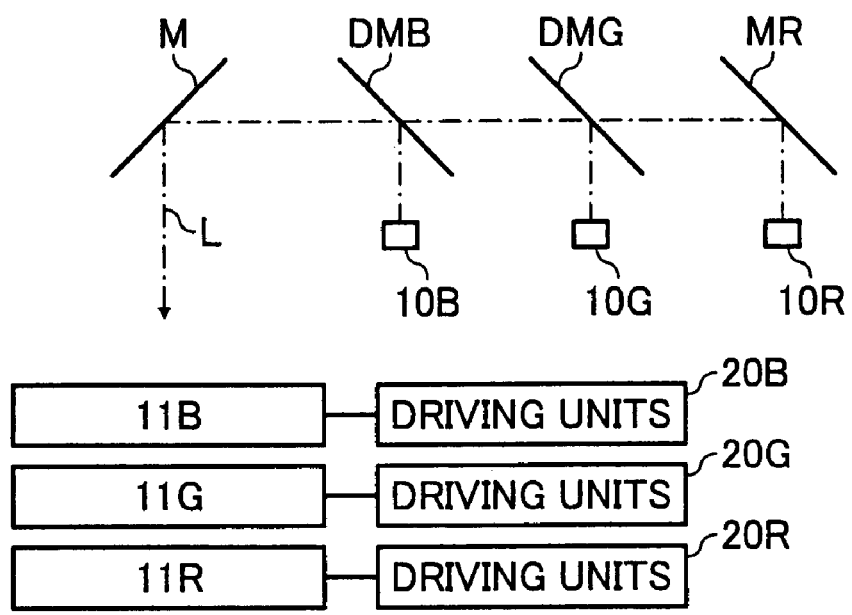
FIG. 3 is a drawing for explaining a color optical switching device according to another embodiment of the present invention.

FIG. 3 is a drawing that conceptually depicts a color optical switching device according to one embodiment.

In the drawing, reference numerals 11B, 11G, 11R denote resonant reflection elements. The resonant reflection element 11B is driven by a driving unit 20B, the resonant reflection element 11G is driven by a driving unit 20G, and the resonant reflection element 11R is driven by a driving unit 20R.

That is, each of these resonant reflection elements and each driving unit driving the relevant one of these elements form an optical switching element. Three optical switching elements are arranged so as to be stacked in a light transmission direction (vertical direction in FIG. 3), thereby forming a color optical switching element.

Reference numerals 10R, 10G, and 10B denote light sources. The light sources 10R, 10G, and 10B have different light-emission wavelength regions not overlapping with one another. The light source 10R emits red light, the light source 10G emits green light, and the light source 10B emits blue light.

The red light emitted from the light source 10R is reflected on a mirror MR to pass through dichroic mirrors DMG and DMB and is then reflected on a mirror M. The green light emitted from the light source 10G is reflected on the dichroic mirror DMG to pass through the dichroic mirror DMB and is then reflected on the mirror M. The blue light emitted from the light source 10B is reflected on the dichroic mirror DMB and is then reflected on the mirror M.

In this manner, the red light, the green light, and the blue light emitted from the light sources 10R, 10G, and 10B, respectively, are combined into a single beam. The single beam enters the color optical switching element.

The resonant reflection element 11B is set so that, in an off state without driving by the driving unit 20B, the resonant reflection element 11B resonant-reflects the blue light from the light source 10B included in the incident light and allows light having other wavelengths to pass. The resonant reflection element 11G is set so that, in an off state without driving by the driving unit 20G, the resonant reflection element 11G resonant-reflects the green light from the light source 10G included in the incident light and allows light having other wavelengths to pass. The resonant reflection element 11R is set so that, in an off state without driving by the driving unit 20R, the resonant reflection element 11R resonant-reflects the red light from the light source 10R included in the incident light and allows light having other wavelengths to pass.

That is, the color optical switching element depicted in FIG. 3 includes three optical switching elements arranged so as to be stacked in a light transmitting direction, and the resonance wavelength of each optical switching element is set at a value allowing light of a desired color to be displayed.

With the driving units 20B, 20G, and 20R driving the corresponding resonant reflection elements 11B, 11G, and 11R to shift the resonant wavelength and turning these elements to be in an ON state, the resonant reflection element 11B allows the blue light from the light source 10B to pass, the resonant reflection element 11G allows the green light from the light source 10G to pass, and the resonant reflection element 11R allows the red light from the light source 10R to pass. Also, in such a state, light passing through any one of the resonant reflection elements also pass through the other resonant reflection elements.

Therefore, when the driving units 20B, 20G, and 20R perform ON/OFF driving on the corresponding resonant reflection elements 11B, 11G, and 11R, with each optical switching element being turned ON/OFF, light passing through the color optical switching element is as follows. In the following, R represents red light, G represents green light, and B represents blue light. Also, w represents white, y represents yellow, p represents purple, b represents blue, o represents orange, g represents green, r represents red, and bk represents black.

| Driven state of 11B | ON | ON | ON | ON | OFF | OFF | OFF | OFF |
|---|---|---|---|---|---|---|---|---|
| Driven state of 11G | ON | ON | OFF | OFF | ON | ON | OFF | OFF |
| Driven state of 11R | ON | OFF | ON | OFF | ON | OFF | ON | OFF |
| Transmission light | R + G + B | B + G | B + R | B | G + R | G | R | none |
| Color of transmitted light | w | y | p | b | o | g | r | bk |

Therefore, color light in a visible region can be displayed as transmitted light.

That is, the color optical switching device of FIG. 3 includes a color optical switching element, and light sources 10B, 10G, and 10R the number of which is equal to the number of transmission-type optical switching elements 11B and 20B, 11G and 20G, and 11R and 20R forming the color optical switching element. The light sources have different light-emission wavelength regions and have wavelengths being combined to construct a desired color. Each light source has a corresponding one of the optical switching elements and, in the optical switching element, one of a resonant wavelength before varying by the driving unit and a resonant wavelength after varying thereby is in a light-emission wavelength region of the corresponding light source. With the resonant wavelength of each of the optical switching elements being varied by a corresponding driving unit to be inside or outside of the light-emission wavelength region of the corresponding light source light of a desired color can be extracted via the color optical switching element.

Also, by further adding an optical switching element using another resonant reflection element having a resonant wavelength different from those of the resonant reflection elements 11B, 11G, and 11R, and also by further adding a light source emitting light having the resonant wavelength of the added optical switching element, the color of the color transmitted light can be varied more finely.

Conversely, when one of the three optical switching elements forming the color optical switching element of FIG. 3 is removed and the light source corresponding to the removed optical switching element is also removed, and then a switching device is formed by the remaining two optical switching elements and two light sources, color light as explained above cannot be displayed. However, light of a plurality of colors can be displayed. That is, such a switching device forms one example of a plural color optical switching device.

Figure 4:
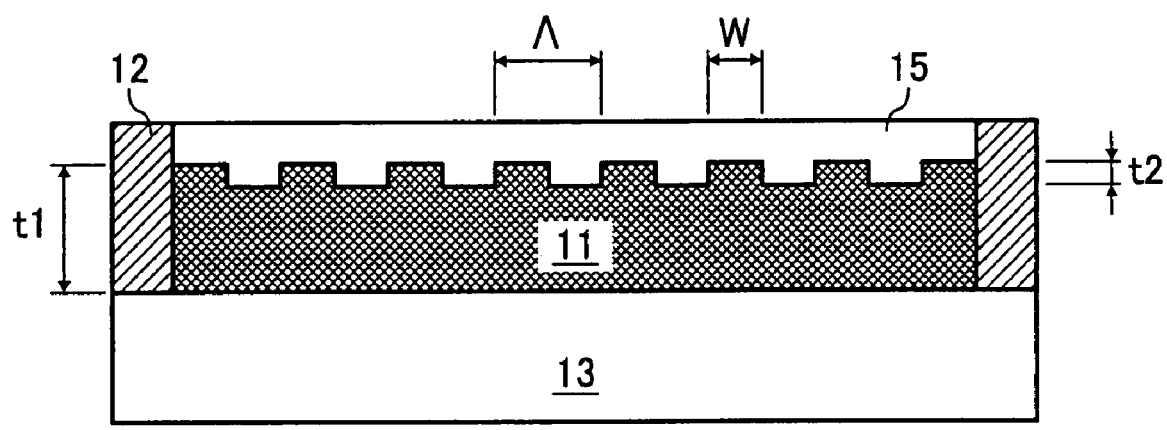
FIG. 4 is a drawing for explaining parameters that influence a resonant wavelength in a resonant reflection element.

FIG. 4 depicts the optical switching element of FIG. 1A with the driving circuit 14 removed therefrom. The resonant wavelength, which is an optical characteristic of the resonant reflection element 11, is defined by physical factors (refractive indexes) of materials of the resonant reflection element 11, the transparent substrate 13, and the transparent protective layer 15 and a shape factor of the resonant reflection element 11. The shape factor is defined by a thickness t2 of the fine periodic structure formed on the upper surface of the resonant reflection element 11 in the drawing, a thickness t1 of a thickness portion functioning as a waveguide layer, and a fill factor f defined by a ratio between a pitch Λ of the fine periodic structure and a width W of the convex portion, that is, f=W/Λ.

Therefore, if the materials of the resonant reflection element 11, the transparent substrate 13, and the transparent protective layer 15 are defined, the optical characteristic mentioned above (the resonant wavelength without driving by the driving unit) is defined by the fill factor f and the thicknesses t1 and t2.

In the following, with reference to FIGS. 5A, 5B, 5C, 5D and 5E, a method of manufacturing functional portions (portions except the driving circuit) of the optical switching element as depicted in FIG. 4 is explained along with a specific example.

Figure 5A:
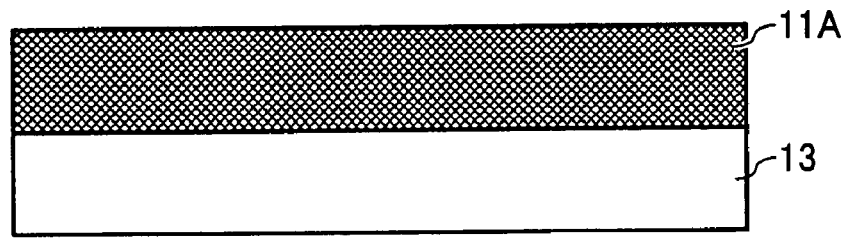
FIGS. 5A, 5B, 5C, 5D, and 5E are drawings for explaining one example of a method of manufacturing the optical switching element shown in FIG. 1A.

As depicted in FIG. 5A, a thin film 11A made of lead lanthanum zirconate titanate (PLZT) is formed through spin coating on the surface of a sapphire substrate 13 polished and cleaned, and is then subjected to heat treatment. A photoresist layer is then formed on the thin film 11A thus formed. With fine patterning, a grid-like photoresist layer is formed.

Figure 5B:
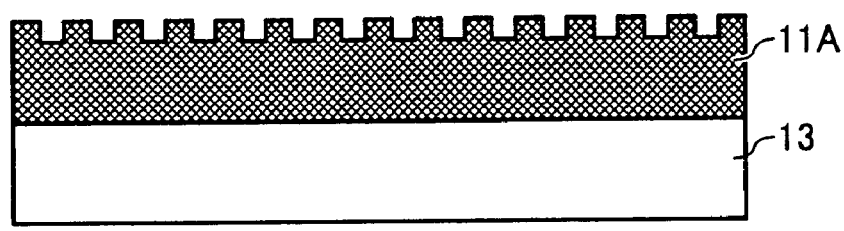

With the grid-like photoresist layer as a mask, the PLZT thin film 11A is etched to a predetermined depth (the thickness t2 mentioned above). FIG. 5B depicts a state of etching. Next, the transparent protective layer 15 is formed on the fine periodic structure with fine asperities formed through etching. For example, ultraviolet curable resin made of acrylic is applied over the fine periodic structure for planarization so that the resin uniformly spreads over the concave portions of the fine periodic structure, and then ultraviolet rays are applied for curing. To allow the resin to easily enter the concave portions of the fine periodic structure, the viscosity of the ultraviolet curable resin is preferably equal to or lower than 10 centipoises (cP).

Next, electrodes serving as the driving elements 12 are formed.

Figure 5C:
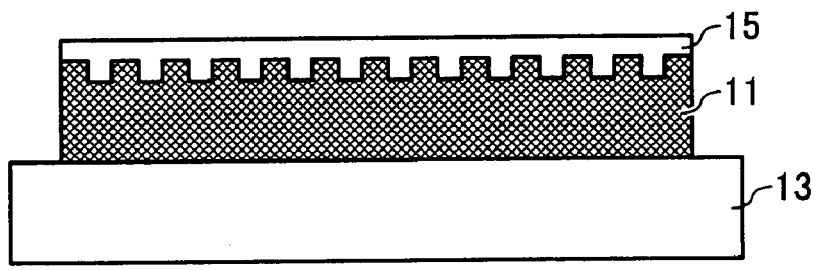

Except a portion on which the electrodes (driving elements 12) are formed, a pattern of a photoresist layer is patterned on the surface of the transparent protective layer 15. With this photoresist layer as a mask, an exposed PLZT thin-layer portion is removed through etching. This state is depicted in FIG. 5C. The PLZT thin film is removed from upper portions on right and left end portions of the transparent substrate 13.

As some additional information, the manufacturing method in this explanation assumes that resonant reflection elements arranged in an array on a single substrate and their driving elements are provided. In practice, the state of FIG. 5C is repeated as spreading in horizontal and front-to-back directions in the drawing. Therefore, a portion with the PLZT thin layer being removed therefrom is shaped like a trench.

Figure 5D:
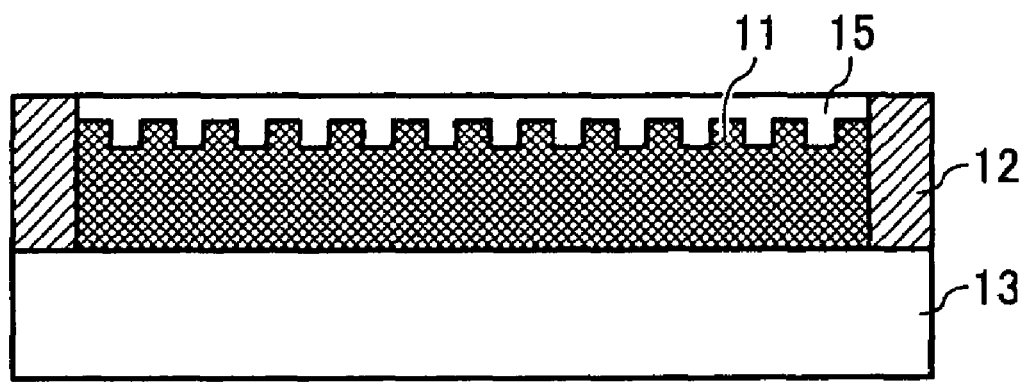

In this state, with the photoresist layer as a mask being left as it is, electrode metal is vapor-deposited. With the trench portions with the PLZT thin layer being removed therefrom being filled with electrode metal, the electrodes (driving elements 12) are formed. Then, by removing the photoresist pattern portion on the transparent protective layer 15, functional portions of the optical switching element can be obtained, as depicted in FIG. 5D.

For patterning of the grid-like photoresist layer formed on the PLZT thin layer 11A due to formation of the fine periodic structure with fine asperities through etching, exposure using a stepper, electron beam rendering using electron beams (EB), scanning exposure with light-gathering beams, and others can be used. However, as a patterning scheme that is excellent in productivity when an optical switching array, which will be explained further below, is monolithically formed on a single plate with a large area, an exposing method with double beam interference (hereinafter, double-beam interference exposure) is suitable.

Figure 5E:
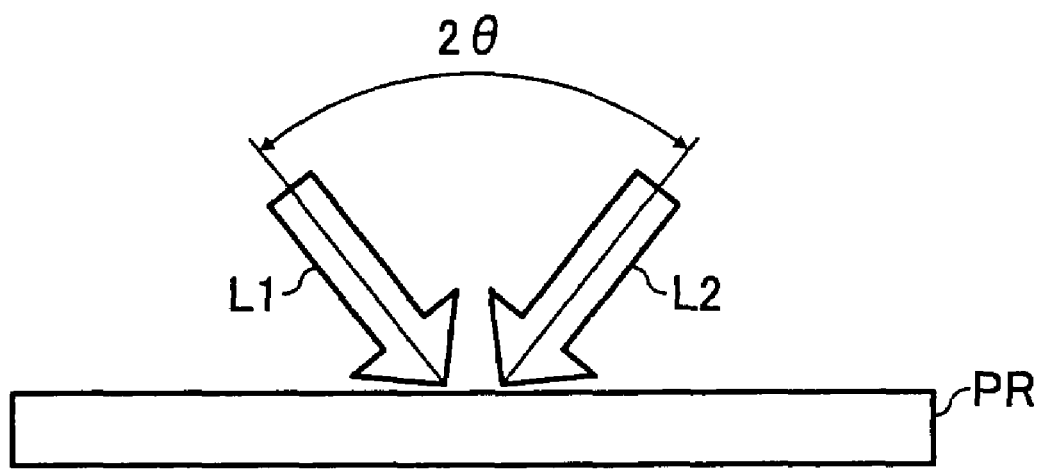

That is, as depicted in FIG. 5E, when interference is caused between monochromatic light beams L1 and L2 having a wavelength λ on a photoresist layer PR so that these light beams form an angle of 2θ, a period P of a grid-like interference fringe occurring due to interference is P=λ/(sin θ). Therefore, by adjusting the angle θ formed by two light beams according to the wavelength λ so that P=Λ, a grid-like photoresist layer with a desired period Λ can be obtained. With this grid-like photoresist layer as a mask, etching is performed to obtain a fine periodic structure. To adjust the fill factor f in the fine periodic structure, exposure strength can be adjusted at the time of double-beam interference exposure.

When the depth (the thickness t2) of the asperities of the fine periodic structure formed on the PLZT thin film 11A explained above is small, etching can be performed with the grid-like photoresist film as a mask, as explained above. When the depth of the asperities is large, a metal thin film is vapor-deposited with the photoresist layer as a mask, and after the photoresist layer is removed, etching can be performed with a grid-like metal pattern formed on the thin film 11A as a mask.

Figure 6A:
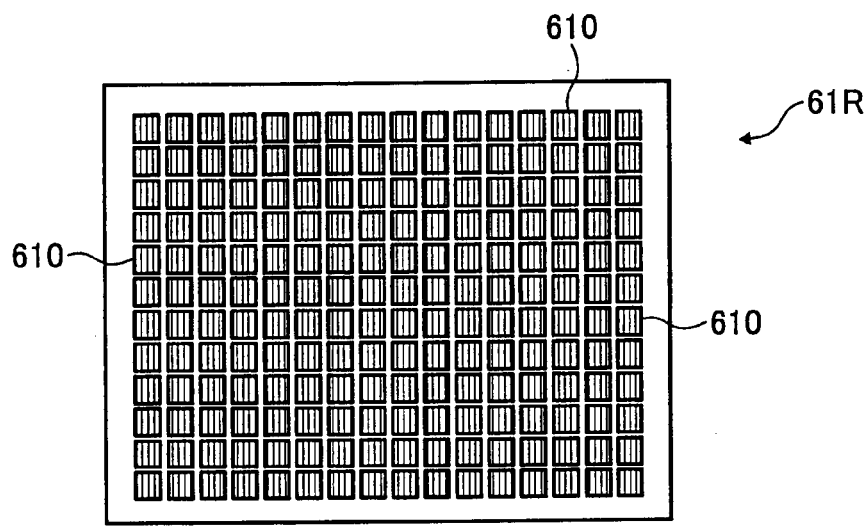
FIGS. 6A and 6B are drawings for explaining one exemplary implementation of a color image displaying apparatus according to still another embodiment of the present invention.
Figure 6B:
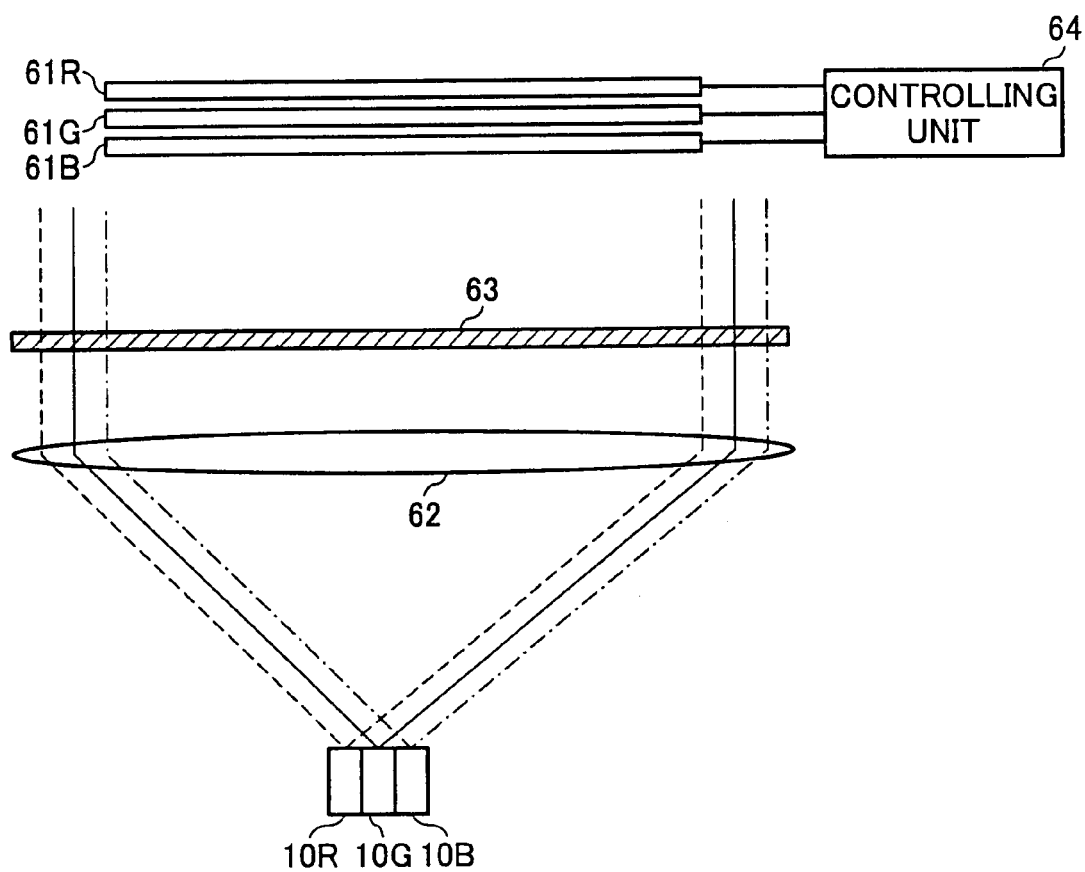

FIGS. 6A and 6B are drawings for explaining one exemplary implementation of a color image displaying apparatus.

FIG. 6A is an explanatory diagram of one of optical switching element arrays forming a color optical switching element array. An optical switching element array 61R depicted as an example is formed with many resonant reflection elements 610 two-dimensionally arranged in an array on a single transparent substrate. Each of the resonant reflection elements 610 has formed thereon electrodes, which are driving elements, and a driving circuit driving these electrodes is also fabricated together with the resonant reflection element. Therefore, the individual resonant reflection elements 610 arranged in an array can be driven independently.

Many resonant reflection elements 610 formed so as to be arranged in an array on the optical switching element array 61R are of the same type. In each of the individual resonant reflection elements 610, as with the resonant reflection element 11R explained along with FIG. 3, in an OFF state without driving by a driving unit, a resonant wavelength is set so as to resonant-reflect red light of incident light and allows lights having other wavelengths to be pass.

In FIG. 6B, optical switching element arrays denoted by reference numerals 61G and 61B are similar in configuration to the optical switching element array 61R explained above. In the optical switching element arrays 61G and 61B, many resonant reflection elements are formed so as to be arranged to be congruent to the arrangement of the resonant reflection elements 610 in the optical switching element array 61R.

The respective resonant reflection elements formed and arranged on the optical switching element array 61G are of the same type and, in an OFF state without driving by a driving unit, a resonant wavelength is set so as to resonant-reflect green light of the incident light and allows lights having other wavelengths to be pass. The respective resonant reflection elements formed and arranged on the optical switching element array 61B are of the same type and, in an OFF state without driving by a driving unit, a resonant wavelength is set so as to resonant-reflect blue light of the incident light and allows lights having other wavelengths to be pass.

As depicted in the drawing, the optical switching element arrays 61B, 61G, and 61R are arranged so as to be superposed one another in a light transmission direction (vertical direction in the drawing). Each resonant reflection element of each optical switching element array is superposed with a resonant reflection element at a corresponding position in another optical switching element array in the light transmission direction.

That is, the optical switching element arrays 61B, 61G, and 61R depicted in FIG. 6B form a color optical switching element array, and this color optical switching element array is equivalent to color optical switching elements two-dimensionally arranged in an array, the color optical switching elements being formed of optical switching elements formed of a resonant reflection element 11B (11G, 11R) and the driving unit 20B (20G, 20R) being stacked in the light transmission direction, and each color optical switching element capable of being driven independently.

Reference numerals 10B, 10G, and 10R in FIG. 6B denote light sources forming a light source unit of a color light source unit. In this embodiment, a high-output LED is used. The light sources 10B, 10G, and 10R are similar to those in the embodiment depicted in FIG. 3. Blue light, green light, and red light emitted from these light sources 10B, 10G, and 10R, respectively, are transformed to parallel light beams by a coupling lens 62, and further to light beams with their strength distribution being two-dimensionally equalized by a homogenizer 63, and are then launched to the color optical switching element array.

When each optical switching element of the optical switching element arrays 61B, 61G, and 61R are in an OFF state (a state where the resonant reflection elements are not driven), the blue light from the light source 10B is resonant-reflected on the optical switching element array 61B, but passes through the optical switching element arrays 61G and 61R. Also, the green light from the light source 10G is resonant-reflected on the optical switching element array 61G, but passes through the optical switching element arrays 61B and 61R. Furthermore, the red light from the light source 10R is resonant-reflected on the optical switching element array 61R, but passes through the optical switching element arrays 61G and 61B.

In the case of an ON state where each optical switching element of the optical switching element array 61B is driven, the blue light from the light source 10B passes through the optical switching element arrays 61B, 61G, and 61R. In the case of an ON state where each optical switching element of the optical switching element array 61G is driven, the green light from the light source 10G passes through the optical switching element arrays 61B, 61G, and 61R. In the case of an ON state where each optical switching element of the optical switching element array 61R is driven, the red light from the light source 10R passes through the optical switching element arrays 61B, 61G, and 61R. Therefore, with the optical switching element arrays 61B, 61G, and 61R forming the color optical switching element array being controlled by a controlling unit 64 according to an image signal, a color image with transmitted light can be displayed.

That is, the color image displaying apparatus depicted in FIG. 6B includes a color optical switching element array formed of the optical switching element arrays 61B, 61G, and 61R, and color light sources 10B, 10G, 10R, 62, and 63 for irradiating each color optical switching element of the color optical switching element array with light having either one of a resonant wavelength before varying by the driving unit and a resonant wavelength after varying thereby of each optical switching element forming the color optical switching element array.

The color image displaying apparatus of FIG. 6B can be implemented as, for example, a view finder. Also, the color image display apparatus can be implemented as a color projector in which, with a projection lens being added to the portion depicted in FIG. 6B, color image light passing through the color optical switching array is enlarged by the projection lens onto a screen for projection. Such a projector has an image displaying unit that is thin and compact compared with that of a color projector using three liquid crystal panels. Furthermore, since the resonant reflection element can be driven at high speed, high-speed changes in displayed image can be supported.

Specific examples are explained below.

A sapphire substrate (its width of 0.5 millimeters) is used as the transparent substrate 13. To its surface, PLZT as a material having an electro-optical effect is applied through spin coating, and then the surface is subjected to heat treatment, thereby forming a PLZT thin layer.

On the surface of the PLZT thin layer, a one-dimensional grid-like fine structure having a section in a rectangular wave shape is formed as the resonant reflection element 11. The formed fine structure has a thickness t2 of 20 nanometers, a pitch Λ of 320 nanometers, and a width W of the convex portion of 160 nanometers. Therefore, a fill factor f=0.5.

In the PLZT thin layer, the portion serving as a waveguide layer has a thickness t1 of 90 nanometers. Here, for the patterning of a photoresist serving as a mask when a one-dimensional grid-like fine structure, double-beam interference exposure explained along with FIG. 5E is used.

As a photoresist, i-line positive photoresist is used. As a light source for exposure, a gas laser of 355 nanometers is used. The transparent protective layer 15 is formed by, as explained above, applying acrylic ultraviolet curable resin with its viscosity adjusted to be equal to or lower than 10 cP, planarizing the surface, and performing thermal treatment.

Also, the electrodes 12, which are driving elements, are formed as explained along with FIGS. 5A to 5E. In this manner, as depicted in FIG. 6A, many optical switching elements are arranged in an array on the single sapphire substrate, and a driving circuit that acts a driving voltage on the electrodes of each resonant reflection element is also fabricated on the sapphire substrate, thereby fabricating an optical switching element array (according to FIG. 6A, optical switching element array 61R). Here, in each optical switching element, a distance between the electrodes 12 that drive the resonant reflection element 11 is 4 micrometers.

In the optical switching element array 61R explained above, when a red high-output LED having a light-emission wavelength (wavelength corresponding to a maximum light-emission strength) of 660 nanometers is used as a light source, the refraction index of the sapphire substrate 13 is 1.76, the refraction index of the PLZT forming the resonant reflection element 11 is 2.54, the refraction index of the acrylic ultraviolet curable resin forming the transparent protective layer 15 is 1.50. As depicted by a spectral transmission curve denoted as a reference numeral 71-R in FIG. 7A, resonant reflection occurs in a narrow band near a wavelength of 660 nanometers, but light having other wavelengths can roughly pass (OFF state).

When a voltage is applied between the electrodes 12, which are driving elements, to act an electric field on the resonant reflection element 11, the optical switching element is turned in an ON state. At this time, the refraction index of a portion functioning as a waveguide layer in PLZT forming the resonant reflection element 11 (portion having the thickness t1) and the refraction index of the fine structure are changed.

When this change in refraction index shifts the resonant wavelength, a shift occurs between the wavelength of the incident light and the resonant wavelength based on the resonant reflection element 11, thereby allowing the incident light having the wavelength of 660 nanometers to pass through the optical switching element.

Figure 7A:
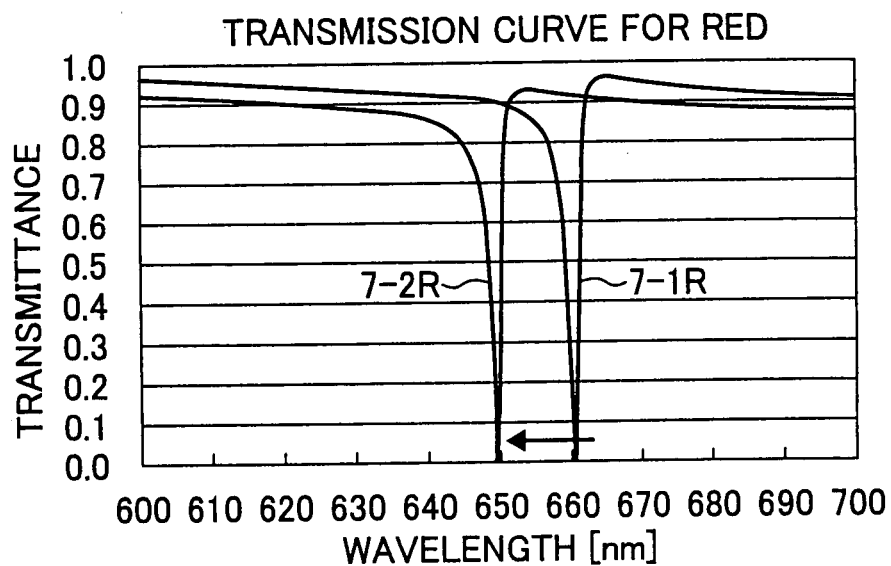
FIGS. 7A, 7B, and 7C are drawings of a spectral transmittance in an ON/OFF state of an array of the optical switching element shown in FIG. 1A.

A curve denoted as a reference numeral 7-2R in FIG. 7A is a spectral transmission curve based on the resonant reflection element in an ON state. Here, the amount of shift of the resonant wavelength can be adjusted by increasing or decreasing the voltage to be applied between the electrodes 12.

As with the above, an optical switching element array 61G using a high-output LED that emits green light having a light-emission wavelength of 570 nanometers as a light source and an optical switching element array 61B using a high-output LED that emits blue light having a light-emission wavelength of 470 nanometers as a light source are fabricated.

These optical switching element arrays 61R, 61G, and 61B are exactly identical to one another in material, and are different from one another only in the pitch Λ of the fine structure, the fill factor f, and the thickness t1. These values are listed below for each optical switching element array.

Optical Switching

|  | Element Array | | |
|---|---|---|---|
|  | 61B | 61G | 61R |
| Pitch Λ: | 215 nm | 270 nm | 320 nm |
| Fill Factor f: | 0.5 | 0.5 | 0.5 |
| Thickness t2: | 20 nm | 20 nm | 20 nm |
| Thickness t1: | 90 nm | 90 nm | 90 nm | where nm represents nanometers.

Figure 7B:
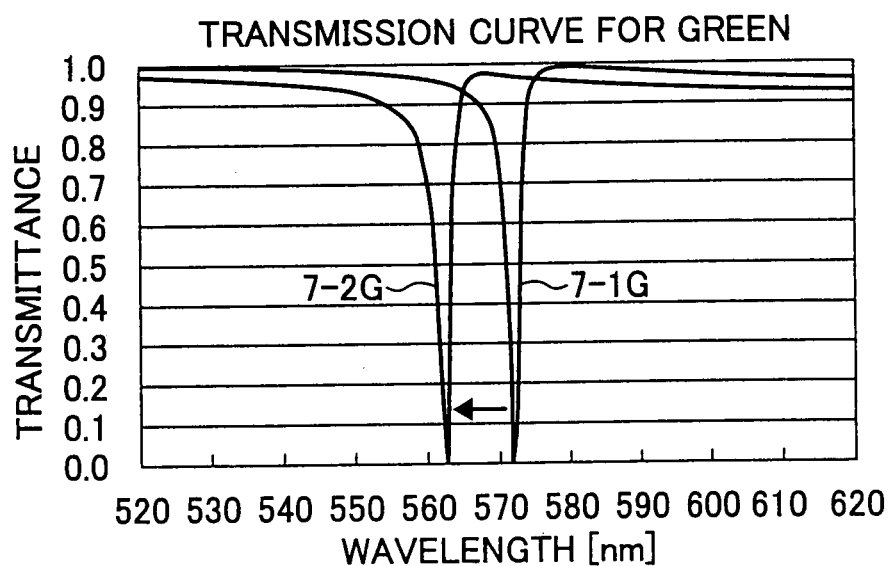

FIG. 7B depicts spectrum transmissions of the optical switching element 61G. In the drawing, a curve denoted as a reference numeral 7-1G represents a spectrum transmission in an OFF state, whilst a curve denoted as a reference numeral 7-2G represents a spectrum transmission in an ON state.

Figure 7C:
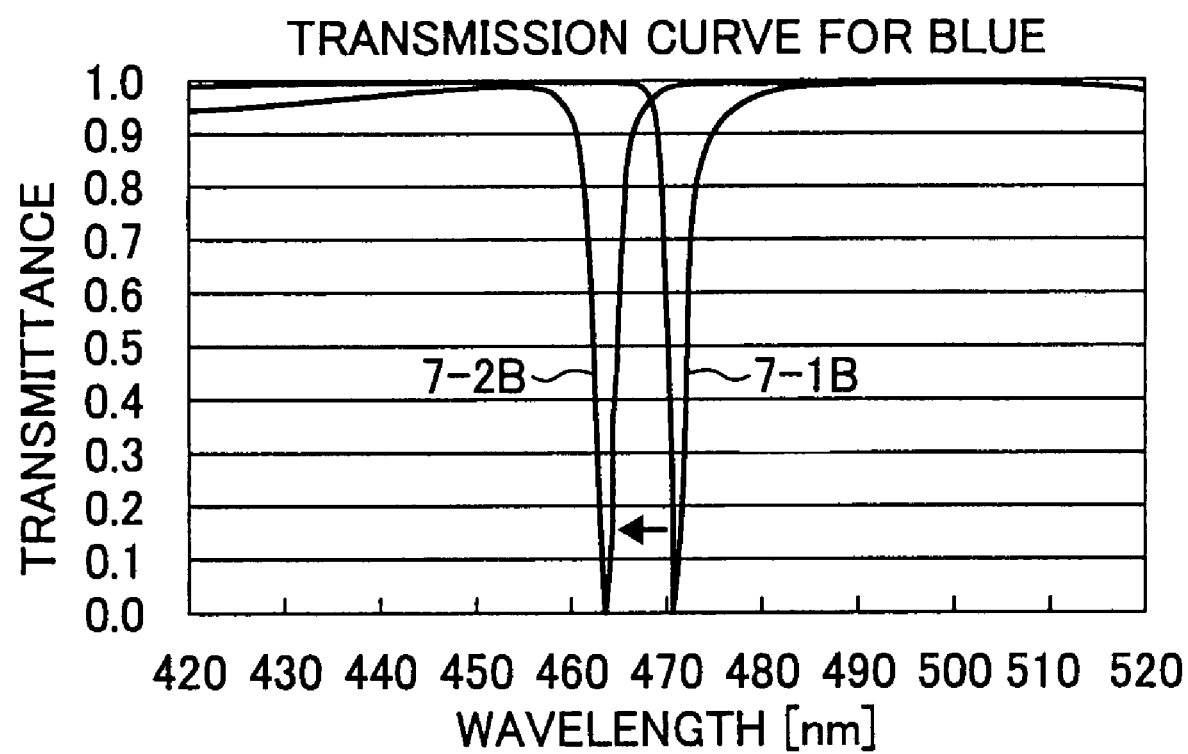

FIG. 7C depicts spectrum transmissions of the optical switching element 61B. In the drawing, a curve denoted as a reference numeral 7-1B represents a spectrum transmission in an OFF state, whilst a curve denoted as a reference numeral 7-2B represents a spectrum transmission in an ON state.

Therefore, by combining these optical switching element arrays 61B, 61G, and 61R, the light sources 10B, 10G, and 10R, which are high-output LED as explained above, the coupling lens 62, and the homogenizer 63 as depicted in FIG. 6B, an excellent color image display can be achieved. The electro-optical effect is such that a high-speed response equal to or larger than several tens of gigahertz is possible. Therefore, a gray-scale control with a sufficient optical strength can be performed for each color.

As some additional information, the applied voltage required for sufficiently changing an optical characteristic of the resonant reflection element varies depending on the distance between the electrodes 12. As the distance between electrodes is shorter and the pixel size is smaller, the applied voltage required for shifting the resonant wavelength can be lower. This is advantageous in view of operation power consumption of the optical switching element. The distance between electrodes is preferably equal to or smaller than 5 micrometers in view of resolution of an image to be displayed and power consumption.

In the example explained above, the voltage is applied with the electrodes 12 being placed on both sides of each pixel. Depending on the selection of an electro-optical material, a transparent conductive thin film can be formed on upper and lower portions of the fine periodic structure for forming electrodes.

Here, when the fine periodic structure with asperities is on a one-dimensional grid and a device, such as an LD, that emits linear polarized light is used as a light source, a positional relation between the light source and the optical switching element is preferably adjusted so that the electric-field resonance direction of the incident light to the resonant reflection element coincides with a grid periodic direction (horizontal direction in FIG. 4).

LDs and LEDs suitable as a light source generally have piece-to-piece variations in light-emission wavelength. However, as explained above, the amount of shift of the resonant wavelength of the optical switching element can be adjusted by increasing or decreasing the voltage to be applied between the electrodes 12. By using this, the resonant wavelength in an OFF state can be made coincident with the light-emission wavelength of the light source.

Also, as a method of letting reflected light go, when the optical switching element is tilted at several degrees with respect to the incident optical axis of the incident light, the transmitted light is allowed to keep going straight, thereby effectively letting the reflected light go away from the light source and preventing the reflected light from returning to the light source.

The optical strength in units of pixels can be adjusted by increasing or decreasing the time of an ON state of each optical switching element forming a unit of pixel. With the use of an optical switching element having a high-speed response capability, such as an electro-optical effect, adjustment of the optical strength at high speed as explained above will lead to an increase in gray-scale levels of brightness. This increase is a great advantage.

As has been explained in the foregoing, according to the present invention, a novel optical switching element as well as an optical switching device, a color image displaying apparatus, and the like using such an optical switching element can be achieved.

In particular, in the image displaying apparatus according to the present invention, in a color optical switching element forming one pixel of a color image to be displayed, three or more types of optical switching elements are arranged so as to be stacked in a light transmission direction. Therefore, when viewed from the light transmission direction, one color pixel can be formed by a single color optical switching element.

Conventionally, when a color image is displayed with a liquid-crystal switching element array, three liquid crystal panels (two-dimensional liquid-crystal optical switching element array) for red (R), green (G), and blue (B) are used, and the respective color images are combined through a cross prism to display a color image.

Also, when a micromirror array for switching incident light by controlling the angle of a reflective micromirror is used, a color filter changed with time is matched in timing with the micromirror, thereby displaying a color image.

Also in color image display using an interferometric optical switching element, for optical switching of three primary colors, a color filter is used as with the micromirror, three types of moving directions to be changed according to each color are provided, and light ON/OFF is performed by changing the position of a semitransparent mirror.

In the conventional color image displaying scheme using a liquid-crystal optical switching element array, a quick response speed has not yet been achieved. Since lights of three primary colors have to be launched from three direction and then be combined by a cross prism, it is difficult to decrease the size and thickness.

Even in color image display using a micromirror array, the amount of light for each color is adjusted in a time-division manner. Therefore, a high-speed response several times higher than normal, theoretically, at least three times, has to be required. Moreover, since a color filter is used, a space for a motor for mechanical operation is required. Furthermore, a decrease occurs in use efficiency of light by cutting other colors by a filter.

Even in color image display using an interferometric optical switching array, as with the liquid-crystal optical switching element array, lights of three primary colors have to be launched from three direction and then be combined by a cross prism. With this configuration, it is difficult to decrease the size and thickness.

By contrast, in the color image displaying apparatus according to the present invention, as explained above, one color pixel can be formed by a single optical switching element when viewed from a light transmission direction. With this, high pixel density can be achieved. Also, a plurality of types of optical switching elements forming one color pixel can be closely arranged in an optical transmission direction. With this, the size and thickness the color image displaying apparatus can be decreased, and the switching response speed of the optical switching element can be increased. With this, a color image can be changed at high speed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multiple wavelength optical switching element, comprising: a plurality of optical switching elements, each of the plurality of optical switching elements further comprising:
   a resonant reflection element having a thickness portion functioning as a waveguide layer, with one surface in a thickness direction functioning as a total reflection surface and other surface having formed thereon a fine periodic structure with fine asperities, the resonant reflection element resonant-reflecting specific wavelength component of light incident from the other surface; and
   a driving unit that varies a resonant wavelength of resonant reflection by varying at least one of a shape and a refractive index of the resonant reflection element,
   wherein the plurality of optical switching elements are of a transmission type, and
   wherein the plurality of optical switching elements are arranged so as to be stacked in a light transmission direction, each of the plurality of optical switching elements having a resonant wavelength before driving by the driving unit is performed being different from a resonant wavelength after driving by the driving unit is performed, each of the plurality of optical switching elements capable of being driven independently, and each of the plurality of optical switching elements being configured to allow lights of other optical switching elements having resonant wavelengths before and after driving by the driving unit to pass through.

2. A color optical switching element, comprising the multiple wavelength optical switching element according to claim 1, wherein at least three of the optical switching elements are arranged so as to be stacked in a light transmission direction, and a resonant wavelength of each of the optical switching element is set to a value allowing light of a desired color to be displayed.

3. A multiple color optical switching device comprising:
   the multiple wavelength optical switching element according to claim 1; and
   a plurality of light sources,
   wherein number is the plurality of light sources and the plurality of optical switching elements are equal, and wherein the plurality of light sources have different light-emission wavelength regions, each of the plurality light sources has a corresponding one of the plurality of optical switching elements and, in each of the plurality optical switching elements, one of a resonant wavelength before and after varying by a driving unit is in a light-emission wavelength region of the corresponding light source, with the resonant wavelength of each of the optical switching elements being varied by a corresponding driving unit to be inside or outside of the light-emission wavelength region of the corresponding light source, and wherein light of a plurality of colors can be extracted via the multiple wavelength optical switching element.

4. A color optical switching device comprising:
the color optical switching element according to claim 2; and
a plurality of light sources,
wherein number of is the plurality of light sources and the plurality of optical switching elements forming the color optical switching element are equal,
wherein the plurality of light sources have different light-emission wavelength regions, wavelengths of light from the plurality of light sources are combined to construct a desired color, each of the plurality of light sources has a corresponding one of the optical switching elements, in each of the plurality optical switching element, one of a resonant wavelength before and after varying by the driving unit is in a light-emission wavelength region of the corresponding light source, with resonant wavelength of each of the optical switching elements being varied by a corresponding driving unit to be inside or outside of the light-emission wavelength region of the corresponding light source, and
wherein light of a desired color can be extracted via the color optical switching element.

5. An optical switching device comprising:
an optical switching element including a resonant reflection element having a thickness portion functioning as a waveguide layer, with one surface in a thickness direction functioning as a total reflection surface and other surface having formed thereon a fine periodic structure with fine asperities, the resonant reflection element resonant-reflecting specific wavelength component of light incident from the other surface;
a driving unit that varies a resonant wavelength of resonant refection by varying at least one of a shape and a refractive index of the resonant reflection element; and
a light source,
wherein the optical switching device is configured so that a resonant wavelength is varied by the driving unit to be inside or outside of a light-emission wavelength region of the light source, thereby allowing light extracted via the optical switching element to blink.

6. An image displaying apparatus comprising:
an array of optical switching elements, each of the optical switching element including a resonant reflection element having a thickness portion functioning as a waveguide layer, with one surface in a thickness direction functioning as a total reflection surface and other surface having formed thereon a fine periodic structure with fine asperities, the resonant reflection element resonant-reflecting specific wavelength component of light incident from the other surface;

a driving unit that varies a resonant wavelength of resonant refection by varying at least one of a shape and a refractive index of the resonant reflection element; and
a light source unit that irradiates each optical switching element of the optical switching element array with light having one of a resonant wavelength before varying by a driving unit and a resonant wavelength after varying thereby of an optical switching element forming the optical switching element array being included in a light-emission wavelength region.

7. An optical switching element array comprising:
a plurality of optical switching elements arranged in a two-dimensional array, each of the plurality of optical switching elements capable of being driven independently and further comprising:
a resonant reflection element having a thickness portion functioning as a waveguide layer, with one surface in a thickness direction functioning as a total reflection surface and other surface having formed thereon a fine periodic structure with fine asperities, the resonant reflection element resonant-reflecting specific wavelength component of light incident from the other surface; and
a driving unit that varies a resonant wavelength of resonant reflection by varying a shape and a refractive index of the resonant reflection element,
wherein the plurality of optical switching elements are of a transmission type.

8. A color projector comprising:
the color optical switching device of claim 4; and
a projection lens, the projection lens being configured to project color image light passing through the color optical switching device onto a screen.

9. A color optical switching element, comprising the multiple wavelength optical switching element according to claim 1,
wherein at least three of the plurality of optical switching elements are arranged so as to be stacked in a light transmission direction, and a resonant wavelength of each of the plurality of optical switching elements is set to a value that allows light of a desired color to be displayed, and
wherein the resonant wavelength of each of the plurality of optical switching elements is determined by refractive index (n) of the resonant reflection element, thickness ($t_1$) of the fine periodic structure, thickness ($t_2$) of the thickness portion, and fill factor (f), the fill factor defined by a ratio of a pitch $\Lambda$ of the fine periodic structure and a width W of a convex portion of the fine periodic structure, as $f=W/\Lambda$.

10. The color optical switching element of claim 9, wherein the pitch, the fill factor, the thickness $t_2$, and the thickness $t_1$ of one of the optical switching elements are about 215 nm, about 0.5, about 20 nm, and about 90 nm, respectively.

11. The color optical switching element of claim 9, wherein the pitch, the fill factor, the thickness $t_2$, and the thickness $t_1$ of one of the optical switching elements are about 270 nm, about 0.5, about 20 nm, and about 90 nm, respectively.

12. The color optical switching element of claim 9, wherein the pitch, the fill factor, the thickness $t_2$, and the thickness $t_1$ of one of the optical switching elements are about 320 nm, about 0.5, about 20 nm, and about 90 nm, respectively.

* * * * *